H. S. ASH & E. H. HAYES.
ADJUSTABLE BEARING.
APPLICATION FILED MAR. 12, 1914.
1,114,668.
Patented Oct. 20, 1914.
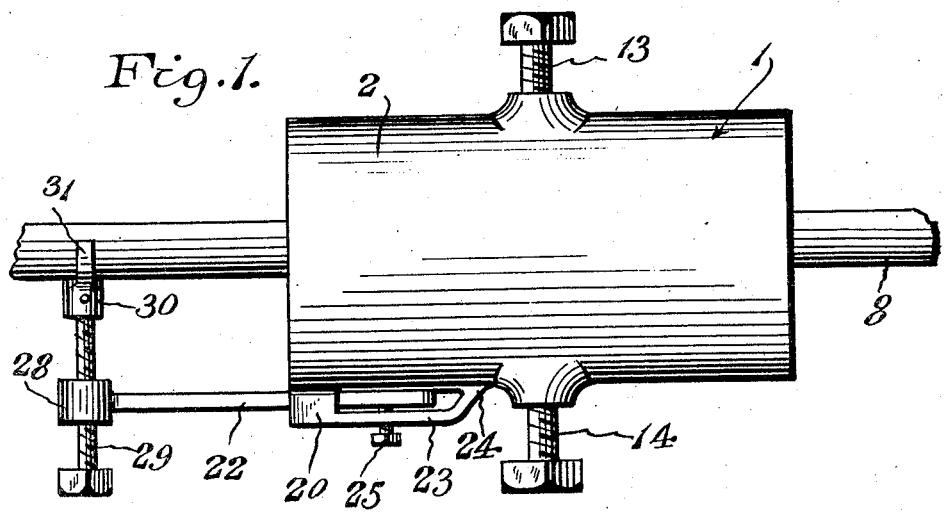
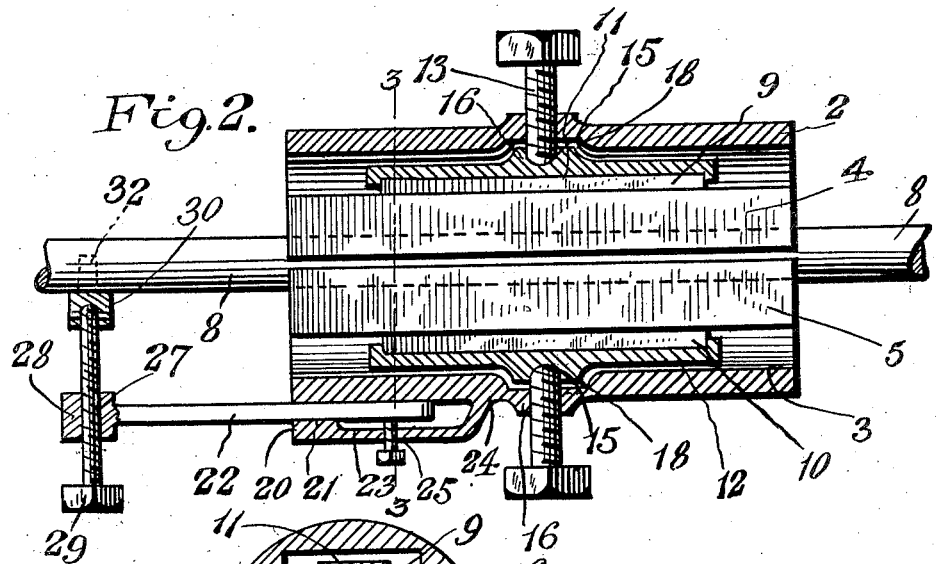
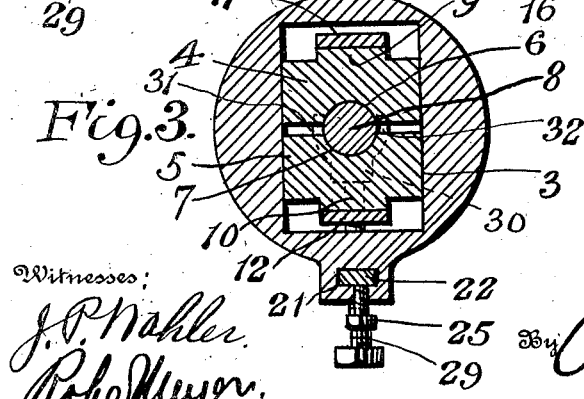
Inventors,
Emet H. Hayes,
H. S. Ash.

UNITED STATES PATENT OFFICE.

HERBERT S. ASH AND EMET H. HAYES, OF KNOXVILLE, TENNESSEE.

ADJUSTABLE BEARING.

1,114,668. Specification of Letters Patent. Patented Oct. 20, 1914.

Application filed March 12, 1914. Serial No. 824,334.

*To all whom it may concern:*

Be it known that we, HERBERT S. ASH and EMET H. HAYES, citizens of the United States, residing at Knoxville, in the county of Knox and State of Tennessee, have invented certain new and useful Improvements in Adjustable Bearings; and we do hereby declare the following to be a full, clear, and exact description of the invention, such as will enable others skilled in the art to which it appertains to make and use the same.

This invention relates to bearings for power shafts and the primary object of the same is the provision of a bearing embodying sliding bearing blocks, which are easily interchangeable or removable for replacement of a new box, and a vertically and laterally adjustable shoe associated with the bearing box support, for supporting the shaft when the bearing boxes become worn by continuous usage, while the bearing blocks are being changed.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a side elevation of the improved bearing box. Fig. 2 is a central sectional view through the improved bearing box, and Fig. 3 is a cross sectional view on the line 3—3 of Fig. 2.

Referring more particularly to the drawings, 1 designates the bearing box as an entirety, which has its outer shell 2 supported in any suitable manner, and being provided with the rectangularly shaped bore 3 extending longitudinally therethrough. The rectangularly shaped bore 3 has removably, or slidably seated therein the two bearing blocks 4 and 5, which blocks have their sides lying in facial abutment with the edges or sides of the bore 3, and have their inner meeting faces provided with semi-circular recesses 6 and 7, which receive and form a bearing for the power shaft 8. The bearing blocks 4 and 5 have rectangularly shaped bosses 9 and 10 formed upon their outer sides, which bosses are inserted in the friction shoes 11 and 12 when the bearing blocks 4 and 5 are properly positioned within the bearing shell 2. The friction shoes 11 and 12 are adjustably held within the rectangular bore 3 of the shell 2, by thumb screws 13 and 14, which thumb screws are seated in recesses 15 formed in the bosses 16, which bosses are formed upon the outer faces of the friction shoes 11 and 12. The friction shoes 11 and 12 have recesses formed in their inner faces for the reception of the bosses 9 and 10, and by adjusting the shoes 11 and 12 by the thumb screws 13 and 14, the shoes may be firmly held in engagement with the lugs 9 and 10, to hold the bearing blocks 4 and 5 rigidly and securely in the proper position for forming a bearing for the shaft 8. The bore 3 of the shell 2 is provided with recesses 18 for the reception of the bosses 16, to permit of the proper adjustment of the shoes 11 and 12, so that they may be moved out of engagement with the bosses 9 and 10, to permit of the sliding removal of the bearing blocks 4 and 5 from the interior of the shell 2.

The shell 2 has formed thereon, a lug 20, which lug is centrally positioned on the vertical radius of the shell 2 and is provided with an opening 21, which opening forms a guide-way for the sliding bar 22. The lug 21 has an arm 23 formed thereon, which arm is spaced from the periphery of the shell 2, being bent inwardly and communicating with the shell at its inner end, as is shown at 24.

The arm 23 has a set screw 25 adjustably carried thereby, which set screw is provided for the purpose of holding the sliding bar 22 in various adjusted positions, having its inner end abutting one surface of the bar and binding it within the guide-way formed in the lug 20 and the inner side of the guide-way formed between the arm 23 and the surface 26 which is formed upon the shell 2 rearwardly of the lug 20. The flat sliding bar 22 has its end 27 enlarged and provided with a screw threaded sleeve 28, which sleeve has adjustably mounted therein a screw member 29. The screw member 29 has a saddle 30 rigidly mounted upon its upper end, and the saddle 30 is positioned, so as that upon adjustment of the screw member 29, the saddle may be moved vertically, for supporting engagement with the power shaft 8, and the shaft may be alined by adjustment of the screw member 29, when the shaft is seated within the saddle 30.

When the bearing blocks 4 and 5 become worn so as to render the bearings imperfect and cause improper rotation of the power shaft 8, the shoe 30 may be moved upwardly so that it will receive the shaft 8 in the semi-circular bearing surface formed between its arms 31 and 32, after which the thumb screws 13 and 14 are adjusted so as to move the friction shoes 11 and 12 out of engagement with the rectangular bosses 9 and 10, to permit of the sliding removal of the bearing blocks 4 and 5 from the interior of the shell 2, so that they may be replaced with new bearing blocks without hindering or stopping the operation of the machine or machinery which are propelled by the power shaft 8.

In practical fields certain minor features of construction, and arrangement of parts may necessitate alterations to which the patentees are entitled provided such alterations are comprehended within the scope of what is claimed.

What we claim is:—

1. In a bearing for rotary shafts, a bearing supporting shell having bearing blocks slidably seated in said bore, means for securely holding said bearing blocks against movement within said shell, and a vertically and horizontally adjustable auxiliary bearing shoe supported by said shell at one end thereof.

2. In a bearing for rotary shafts, a bearing supporting shell having a rectangular bore, bearing blocks slidably seated in said bore and having bearing surfaces formed in their meeting faces, means for binding engagement with said bearing blocks for holding them against movement within said shell, and a vertically and horizontally adjustable bearing shoe supported by said shell at one end thereof.

In testimony whereof we affix our signatures in presence of two witnesses.

HERBERT S. ASH.
EMET H. HAYES.

Witnesses:
 ASA WELLS,
 F. M. WELLS.